(12) United States Patent
Suyama et al.

(10) Patent No.: US 12,448,173 B2
(45) Date of Patent: Oct. 21, 2025

(54) CONTAINER AND METHOD FOR CLOSING AN OPENING OF CONTAINER

(71) Applicants: KABUSHIKI KAISHA TOSHIBA, Minato-ku (JP); Toshiba Energy Systems & Solutions Corporation, Kawasaki (JP)

(72) Inventors: Shoko Suyama, Kawasaki (JP); Masaru Ukai, Yokohama (JP); Masayuki Uchihashi, Yokohama (JP); Kazuo Kakiuchi, Fujisawa (JP)

(73) Assignees: KABUSHIKI KAISHA TOSHIBA, Minato-ku (JP); Toshiba Energy Systems & Solutions Corporation, Kawasaki (JP)

( * ) Notice: Subject to any disclaimer, the term of this patent is extended or adjusted under 35 U.S.C. 154(b) by 1064 days.

(21) Appl. No.: 16/132,644

(22) Filed: Sep. 17, 2018

(65) Prior Publication Data

US 2019/0092697 A1     Mar. 28, 2019

(30) Foreign Application Priority Data

Sep. 25, 2017 (JP) .................................. 2017-183669
Jun. 15, 2018 (JP) .................................. 2018-114746

(51) Int. Cl.
*C04B 35/80* (2006.01)
*B65D 13/02* (2006.01)
(Continued)

(52) U.S. Cl.
CPC ......... *B65D 13/02* (2013.01); *B65D 39/0047* (2013.01); *B65D 39/04* (2013.01);
(Continued)

(58) Field of Classification Search
CPC .... B65D 85/70; B65D 39/0047; B65D 13/02; B65D 39/08; B65D 43/022; B65D 39/04;
(Continued)

(56) References Cited

U.S. PATENT DOCUMENTS 5,353,619 A * 10/1994 Chu ................... B21D 51/2638
                                                72/126
5,660,303 A *  8/1997 Hirose ..................... G03C 3/00
                                                220/780
(Continued)

FOREIGN PATENT DOCUMENTS

CA      2 974 485 A1    6/2016
CN      102188865 A     9/2011
(Continued)

*Primary Examiner* — Andrew D Perreault
(74) *Attorney, Agent, or Firm* — Oblon, McClelland, Maier &Neustadt, L.L.P.

(57) ABSTRACT

A container comprising: a container body that includes a wall portion separating inside and outside and is formed of a long-fiber-reinforced silicon-carbide composite material obtained by combining monofilaments of silicon carbide with a silicon carbide matrix, the wall portion having a thickness equal to a specific dimension; and a lid configured to close an opening of the container body, formed of a material containing at least silicon carbide, and equipped with such a wall portion separating inside and outside that thickness is within a range of 1 to 3 times the specific dimension.

15 Claims, 12 Drawing Sheets

(51) Int. Cl.
*B65D 39/00* (2006.01)
*B65D 39/04* (2006.01)
*B65D 39/08* (2006.01)
*B65D 41/04* (2006.01)
*B65D 43/02* (2006.01)
*B65D 85/00* (2006.01)
*C04B 35/565* (2006.01)
*C04B 37/00* (2006.01)

(52) U.S. Cl.
CPC ......... *B65D 39/08* (2013.01); *B65D 41/0457* (2013.01); *B65D 43/022* (2013.01); *B65D 43/0222* (2013.01); *B65D 43/0229* (2013.01); *B65D 43/0231* (2013.01); *B65D 85/70* (2013.01); *C04B 35/565* (2013.01); *C04B 35/80* (2013.01); *C04B 37/005* (2013.01); *C04B 37/006* (2013.01); *B65D 2543/00092* (2013.01); *B65D 2543/00203* (2013.01); *B65D 2543/00305* (2013.01); *B65D 2543/00425* (2013.01); *B65D 2543/00564* (2013.01); *B65D 2543/00953* (2013.01); *C04B 2235/483* (2013.01); *C04B 2235/5244* (2013.01); *C04B 2235/526* (2013.01); *C04B 2235/614* (2013.01); *C04B 2235/616* (2013.01); *C04B 2237/08* (2013.01); *C04B 2237/083* (2013.01); *C04B 2237/12* (2013.01); *C04B 2237/123* (2013.01); *C04B 2237/124* (2013.01); *C04B 2237/125* (2013.01); *C04B 2237/365* (2013.01); *C04B 2237/38* (2013.01)

(58) Field of Classification Search
CPC ............ B65D 43/0229; B65D 43/0222; B65D 43/0231; B65D 41/0457; B65D 2543/00564; B65D 2543/00953; B65D 2543/00305; B65D 2543/00425; B65D 2543/00203; B65D 2543/00092; C04B 35/565; C04B 37/006; C04B 37/005; C04B 35/80; C04B 2235/614; C04B 2237/123; C04B 2237/125; C04B 2235/5244; C04B 2237/12; C04B 2237/365; C04B 2235/616; C04B 2237/38; C04B 2235/483; C04B 2237/083; C04B 2237/124; C04B 2235/526; C04B 2237/08; G21C 3/10; G21C 21/02; G21C 3/07; Y02E 30/30
USPC ....................................................... 220/288
See application file for complete search history.

(56) References Cited

U.S. PATENT DOCUMENTS

| | | | |
|---|---|---|---|
| 6,226,342 | B1 | 5/2001 | Micko et al. |
| 9,776,380 | B2 * | 10/2017 | Hayashi ................ C04B 37/008 |
| 10,145,271 | B2 * | 12/2018 | Brown ...................... F01L 1/181 |
| 10,781,026 | B2 * | 9/2020 | Sato .................... B65D 43/0231 |
| 2006/0039524 | A1 | 2/2006 | Feinroth et al. |
| 2008/0078501 | A1 * | 4/2008 | Li .......................... C04B 37/005 |
| | | | 156/305 |
| 2011/0268243 | A1 | 11/2011 | Hallstadius et al. |
| 2014/0153688 | A1 | 6/2014 | Zabiego et al. |
| 2016/0354869 | A1 * | 12/2016 | Kumar ................... C22C 19/05 |
| 2017/0229195 | A1 | 8/2017 | Suyama et al. |
| 2017/0301414 | A1 | 10/2017 | Ishibashi et al. |
| 2017/0330638 | A1 | 11/2017 | Ishibashi et al. |

FOREIGN PATENT DOCUMENTS

| | | |
|---|---|---|
| CN | 205900519 U | 1/2017 |
| JP | 63-170279 A | 7/1988 |
| JP | 10-182256 A | 7/1998 |
| JP | 2010-77019 A | 4/2010 |
| JP | 2010-232165 A | 10/2010 |
| JP | 4763699 | 8/2011 |
| JP | 2012-233734 A | 11/2012 |
| JP | 2013-529298 | 7/2013 |
| JP | 5696174 | 4/2015 |
| JP | 2016-024062 | 2/2016 |
| JP | 2016-114555 | 6/2016 |
| JP | 2016-200465 | 12/2016 |
| JP | 2017-072430 | 4/2017 |
| JP | 2017-88423 A | 5/2017 |
| JP | 2017-515094 | 6/2017 |
| JP | 2018-030753 | 3/2018 |
| WO | WO 2015/175034 A2 | 11/2015 |
| WO | WO 2016/084146 A1 | 6/2016 |
| WO | WO 2017/033276 A1 | 3/2017 |

* cited by examiner

| | LID SHAPE | SCREW CUTTING | INTER-MEDIATE MATERIAL | BONDING STRENGTH | AIR-TIGHTNESS | RESISTANCE TO ENVIRONMENT |
|---|---|---|---|---|---|---|
| FIRST EXAMPLE (FIG. 2) | FLAT PLATE | NOT FORMED | USED | POOR | GOOD | GOOD |
| SECOND EXAMPLE (FIG. 3) | OUTER STOPPER | NOT FORMED | USED | GOOD | GOOD | GOOD |
| THIRD EXAMPLE (FIG. 4) | INNER STOPPER | NOT FORMED | USED | GOOD | GOOD | GOOD |
| FOURTH EXAMPLE (FIG. 5) | INNER-AND-OUTER STOPPER | NOT FORMED | USED | GOOD | GOOD | GOOD |
| FIRST COMPARATIVE EXAMPLE (FIG. 6) | INNER-AND-OUTER SOLID STOPPER | NOT FORMED | USED | GOOD | GOOD | POOR |
| FIFTH EXAMPLE (FIG. 7) | OUTER STOPPER | FORMED | USED | GOOD | GOOD | GOOD |
| SIXTH EXAMPLE (FIG. 8) | INNER STOPPER | FORMED | USED | GOOD | GOOD | GOOD |
| SEVENTH EXAMPLE (FIG. 9) | INNER-AND-OUTER STOPPER | FORMED | USED | GOOD | GOOD | GOOD |
| SECOND COMPARATIVE EXAMPLE (FIG. 10) | INNER-AND-OUTER SOLID STOPPER | FORMED | USED | GOOD | GOOD | POOR |
| EIGHTH EXAMPLE (NOT SHOWN) | OUTER STOPPER | FORMED | NOT USED | GOOD | POOR | GOOD |
| NINTH EXAMPLE (NOT SHOWN) | INNER STOPPER | FORMED | NOT USED | GOOD | POOR | GOOD |
| TENTH EXAMPLE (NOT SHOWN) | INNER-AND-OUTER STOPPER | FORMED | NOT USED | GOOD | POOR | GOOD |
| THIRD COMPARATIVE EXAMPLE (NOT SHOWN) | INNER-AND-OUTER SOLID STOPPER | FORMED | NOT USED | GOOD | POOR | POOR |

FIG. 13

| | LID (L)/ CONTAINER BODY (B) | CRACK | AIRTIGHTNESS | |
|---|---|---|---|---|
| FIRST TEST SPECIMEN | 0.5 | NONE | $1 \times 10^{-4}$ Pa m$^3$/s | REJECTED |
| SECOND TEST SPECIMEN | 1 | NONE | NOT MORE THAN DETECTION LIMIT VALUE | ACCEPTABLE |
| THIRD TEST SPECIMEN | 2 | NONE | NOT MORE THAN DETECTION LIMIT VALUE | ACCEPTABLE |
| FOURTH TEST SPECIMEN | 3 | NONE | NOT MORE THAN DETECTION LIMIT VALUE | ACCEPTABLE |
| FIFTH TEST SPECIMEN | 4 | NONE | $3 \times 10^{-4}$ Pa m$^3$/s | REJECTED |
| SIXTH TEST SPECIMEN | 5 | OCCURRED | – | – |

CONTAINER AND METHOD FOR CLOSING AN OPENING OF CONTAINER

CROSS-REFERENCE TO RELATED APPLICATION

This application is based upon and claims the benefit of priority from Japanese Patent Application No. 2017-183669, filed on Sep. 25, 2017 and Japanese Patent Application No. 2018-114746, filed on Jun. 15, 2018, the entire contents of each of which are incorporated herein by reference.

FIELD

Embodiments of the present invention relates in general to a technique for closing an opening of a container formed of a long-fiber-reinforced silicon-carbide composite material (i.e., long-fiber-reinforced silicon carbide material or silicon-carbide fiber-reinforced composite).

BACKGROUND

Members formed of silicon carbide that is a ceramic material have less deterioration in strength in a high temperature environment, have higher hardness than a metal member, and are excellent in properties such as wear resistance, heat resistance, oxidation resistance, corrosion resistance, and lightness. Thus, silicon carbide members are used as components of various technical fields, such as heavy electric equipment components, aircraft components, automobile components, components of electronic equipment, precision machinery components, and components of semiconductor devices. In order to enhance fracture toughness of such a silicon carbide member, there has been developed a long-fiber-reinforced silicon-carbide composite material that is obtained by combining monofilaments (i.e., continuous fibers) of silicon carbide with a silicon carbide matrix (i.e., base material).

Since a long-fiber-reinforced silicon-carbide composite material has excellent corrosion resistance from a low temperature region to a high temperature region and is excellent in resistance to environment, the long-fiber-reinforced silicon-carbide composite material is expected to be used as a material for containers for storing solid, liquid, or gas. For instance, there is a container in which a fuel cladding tube for accommodating nuclear fuel and an end plug for closing the opening at the end of the fuel cladding tube are formed of a long-fiber-reinforced silicon-carbide composite material.

[Patent Document 1] WO 2016/084146

When a long-fiber-reinforced silicon-carbide composite material is used and a solid member such as an end plug is bonded to a fuel cladding tube having a small thickness, there is a problem that the end plug is easily cracked in the case of expanding or shrinking due to temperature change during manufacture or during use.

In view of the above-described problem, an object of embodiments of the present invention is to improve resistance to temperature change in a technique for closing an opening of a container formed of a long-fiber-reinforced silicon-carbide composite material.

BRIEF DESCRIPTION OF THE DRAWINGS

In the accompanying drawings:

FIG. 13 is a table illustrating test results of respective examples and comparative examples;

FIG. 16 is a table illustrating a result of a thermal shock test.

DETAILED DESCRIPTION

In one embodiment of the present invention, a container comprising: a container body that includes a wall portion separating inside and outside and is formed of a long-fiber-reinforced silicon-carbide composite material obtained by combining monofilaments of silicon carbide with a silicon carbide matrix, the wall portion having a thickness equal to a specific dimension; and a lid configured to close an opening of the container body, formed of a material containing at least silicon carbide, and equipped with such a wall portion separating inside and outside that thickness is within a range of 1 to 3 times the specific dimension.

According to embodiments of the present invention provide to improve resistance to temperature change in a technique for closing an opening of a container formed of a long-fiber-reinforced silicon-carbide composite material.

Hereinafter, embodiments will be described with reference to the accompanying drawings. First, a description will be given of a container and a method for closing an opening of a container according to the present embodiment with reference to FIG. 1 to FIG. 13. Note that FIG. 2 to FIG. 11B are drawn as end views in order to aid understanding. The reference sign 1 in FIG. 1 denotes the container according to the present embodiment. The container 1 includes a container body 2 and a lid 3.

Figure 1:
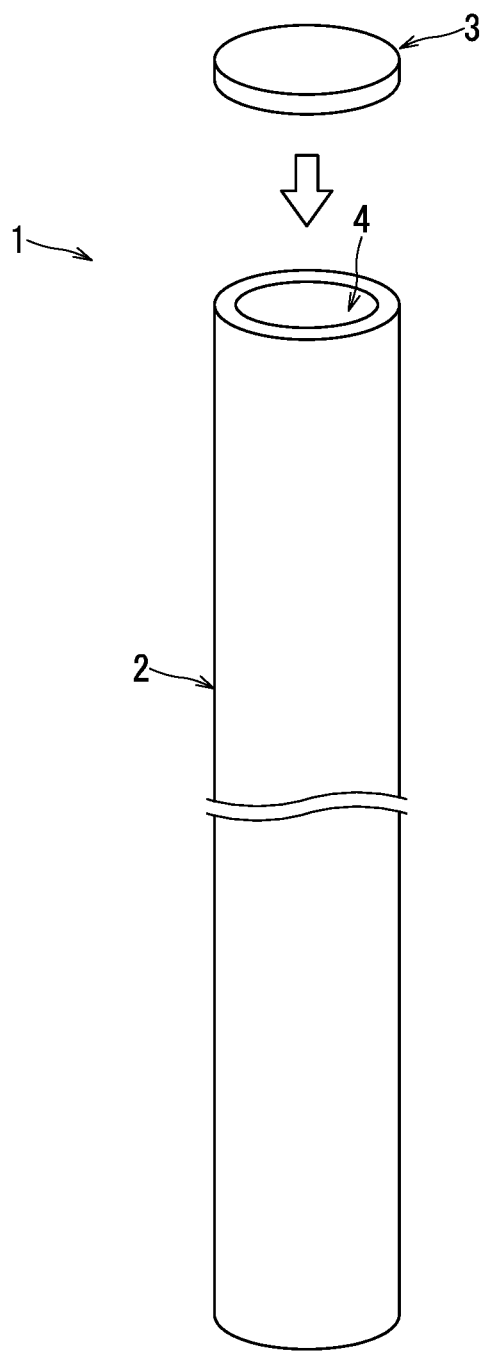
FIG. 1 is a perspective view illustrating a container body and a lid.

As shown in FIG. 1, the container body 2 has a cylindrical shape. The container 1 of the present embodiment can be used for, e.g., a fuel cladding tube for accommodating nuclear fuel of various nuclear reactors, a capsule for enclosing molten-salt heat-storage-material, and a container. Further, the container 1 can be used as a capsule or container for enclosing various wastes.

Additionally, substances other than nuclear fuel may be contained in the container 1. The substance to be contained may be any substance of solid, liquid, or gas. In addition to the nuclear power related technology, the container 1 can be used in a wide range of technical fields such as power generation related technology, military technology, aerospace technology, and electronics technology.

At the end of the container body 2, a circular opening 4 is formed. In the present embodiment, the shape of the container body 2 is exemplified as a bottomed cylindrical shape in which the opening 4 is provided at one end portion and the other end portion is closed. Further, the opening 4 at one end portion is closed with the lid 3. It should be noted that the container body 2 may be provided with respective openings 4 at both ends. In this case, the respective two openings 4 are closed with two lid 3.

Figure 7:
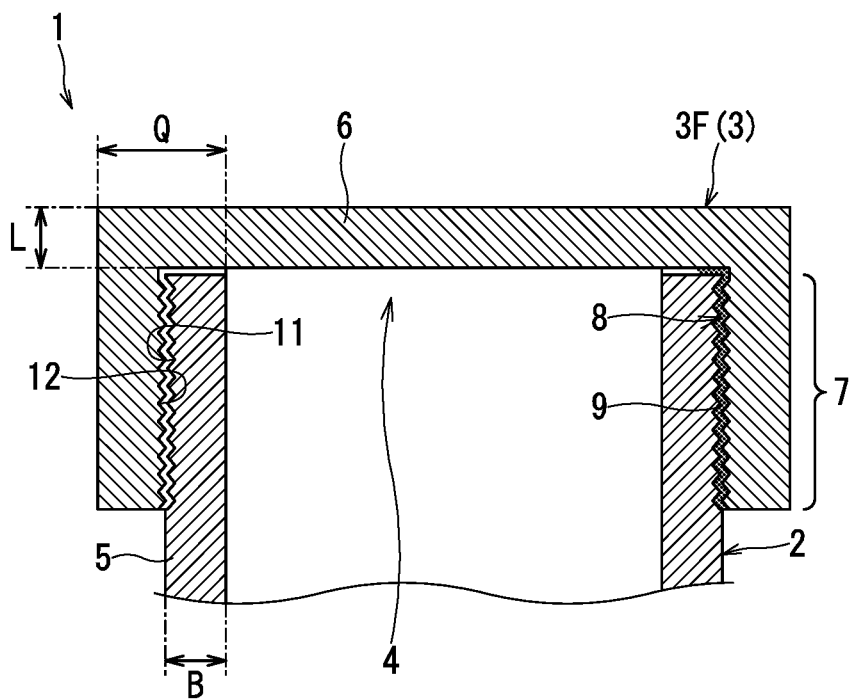
FIG. 7 is a schematic cross-sectional view illustrating a state in which the opening of the container body is closed with the lid of the fifth example.

On the outer surface of the container body 2, a screw cutting 11 is formed at the end side to be closed with the lid 3 (FIG. 7). On the inner surface of the lid 3, a screw cutting 12 is formed so as to mesh with the screw cutting 11 (FIG. 7). The protrusions (i.e., apexes) of the respective screw cuttings 11 and 12 are subjected to C chamfering or round chamfering in order to alleviate stress concentration.

The container body 2 and the lid 3 are formed of a long-fiber-reinforced silicon-carbide composite material obtained by combining monofilaments of silicon carbide with a silicon carbide matrix (i.e., base material). In this manner, the fracture toughness of the container body 2 and the lid 3 can be enhanced. In particular, when a member is formed of only silicon carbide (i.e., silicon carbide monolithic material), brittle fracture may occur when a crack occurs. For this reason, by forming a member with a long-fiber-reinforced silicon-carbide composite material, its fracture toughness is enhanced and thus brittle fracture can be suppressed.

In the case of manufacturing the container body 2 and/or the lid 3 by using a long-fiber-reinforced silicon-carbide, for instance, each fiber bundle (i.e., yarn) is formed first by bundling about 500 to 3000 monofilaments of silicon carbide having a diameter of about 10 μm. Next, an interface material is formed on the surface of each fiber bundle.

Thereafter, a tubular preforming body (i.e., fiber preform) is formed by using the fiber bundles, on each of which the interface material has been formed. This preforming body is formed by a filament winding method or a blading method. The preforming body is formed by arranging the fiber bundles in a two-dimensional direction or a three-dimensional direction. Additionally or alternatively, the preforming body may be formed by weaving the fiber bundles.

Next, by forming a matrix inside the preforming body, the container body 2 and the lid 3 of long-fiber-reinforced silicon-carbide are completed. In the present embodiment, the container body 2 and/or the lid 3 is formed by using at least one of a chemical vapor deposition method and a chemical vapor infiltration method. In this manner, the manufacturability of the container body 2 and/or the lid 3 can be improved.

In the present embodiment, a matrix is formed by using, e.g., a chemical vapor infiltration (CVI) method. Formation of this matrix is performed by filling the inside of the preforming body with powder under a powder casting method and then performing reaction sintering. If necessary, dense silicon carbide is coated by chemical vapor deposition such that the periphery of the matrix formed by the chemical vapor infiltration method is covered. In particular, the surface of each of the container body 2 and the lid 3 is covered with a matrix of dense silicon carbide in such a manner that the monofilaments are not exposed.

Besides this, matrix formation can be performed by a precursor impregnation and pyrolysis (PIP) method. In the PIP method, for instance, a matrix is formed by repeating the process of impregnating a ceramic precursor such as polycarbosilane in the preforming body formed of ceramic fibers and then burning it. This process is repeated plural times (e.g., 6 to 7 times).

In the PIP method, fine cracks are generated in the matrix due to size change such as contraction caused by burning. Thus, in order to sufficiently ensure adhesion and airtightness (i.e., hermeticity) of the completed container 1, it is preferable to form the matrix by the chemical vapor deposition or the chemical vapor infiltration instead of the PIP method. Further, the matrix may be formed by a silicon infiltration method.

The container body 2 can obtain excellent resistance to environment and excellent corrosion resistance from a low temperature region to a high temperature region by being formed into a cylindrical shape with the use of long-fiber-reinforced silicon-carbide.

When the length direction of the cylindrical shape is defined as an X direction and the circumferential direction is defined as a Y direction, it is preferable that the direction (i.e., reinforcing/arranging direction) in which the fibers of the preforming body extend is within the X-Y plane. In a case where the fibers extend in the thickness direction (i.e., Z direction) orthogonal to both of the X direction and the Y direction, there is a possibility that the ends of the fibers are exposed on the inner surface side of the container 1. Since the fibers come into direct contact with the contents of the container 1 in this case, this case is not preferable from the viewpoints of oxidation resistance and corrosion resistance. Thus, in the present embodiment, by setting the extending direction of the fibers within the X-Y plane, it is possible to prevent the fibers from being in direct contact with the contents of the container 1.

Note that the lid 3 may be formed of a silicon carbide monolithic material. The container body 2 is preferably formed of a long-fiber-reinforced silicon-carbide composite material, because the container body 2 is required to maintain the entire shape of the container 1 and maintain its strength. On the other hand, an auxiliary member such as the lid 3 may be formed of a silicon carbide monolithic material, because such an auxiliary member is not required to maintain the strength of the entire container 1.

Next, a description will be given of examples of the lid 3 on the basis of FIG. 2 to FIG. 5 and FIG. 7 to FIG. 9 by arbitrarily referring to comparative examples shown in FIG. 6 and FIG. 10 as required. The respective examples and comparative examples differ in shape of the lid 3 and closing method from each other. Each figure illustrates a cross-ssection (i.e., end face) that is orthogonal to the axial direction of the container body 2.

As shown in FIG. 2 to FIG. 10, the container body 2 is a cylindrical tubular body. In each of the examples and comparative examples, the container body 2 has the same configuration. In the container body 2, the thickness B of the wall portion 5 separating its inside and outside is uniform in both the circumferential direction and the longitudinal direction of the container body 2. This thickness B of the container body 2 is defined as a specific dimension in the present embodiment. The specific dimension of the thickness B of the wall portion 5 of the container body 2 is appropriately set depending on various conditions such as the use of the container 1 and the use environment (e.g., temperature environment). In other words, the specific dimension is a reference dimension for designing the entire container 1.

The thickness B of the wall portion 5 of the container body 2 of the present embodiment is preferably 0.5 mm or more and 5.0 mm or less. Further, in the lid 3, it is preferable that the thickness L of the wall portion 6 separating its inside and outside is 0.5 mm or more and 5.0 mm or less.

Moreover, under the state where the opening 4 of the container body 2 is closed with the lid 3, an intermediate material 9 is used as sealant and adhesive agent to fill the gap 8 between respective bonding surfaces of the container body 2 and the lid 3 (i.e., the gap 8 of the portion 7 where the container body 2 and the lid 3 face and overlap each other). By using this intermediate material 9 for sealant, it is possible to seal the opening 4 physically or chemically.

The intermediate material 9 of the present embodiment contains at least one of (a) an inorganic adhesive using metal alkoxide of silicate type or phosphate type, (b) a ceramic precursor polymer of polycarbosilane, polycarbosilazane, or polyorganoborosilazane, (c) a carbon adhesive using phenolic resin, (d) a metal brazing material of silver braze, gold braze, platinum braze, palladium braze, phosphorous copper braze, or nickel braze, and (e) an inorganic brazing material of glass, silicon, or metal oxide. Note that the intermediate material 9 may be formed of only one of these materials or may be formed of combination of plural of these materials. It is possible to enhance the airtightness (i.e., hermeticity) and bonding strength of the bonding portion between the container body 2 and the lid 3 by using the intermediate material 9 for filling the gap 8 between the respective bonding surfaces of the container body 2 and the lid 3 (i.e., the gap 8 of the portion 7 where the container body 2 and the lid 3 overlaps with each other). Further, the intermediate material 9 is appropriately selected depending on the use of the container 1.

Further, when an inorganic adhesive containing a silicate-based or phosphate-based metal alkoxide is used as the intermediate material 9, a pasty or slurry adhesive is applied on the respective bonding surfaces of the lid 3 and the cylindrical container body 2 to be sealed with this lid 3. After the inorganic adhesive is dried, it is burned. This inorganic adhesive is adhered and bonded to the substrate by starting the polycondensation reaction (i.e., condensation polymerization reaction) simultaneously with the hydrolysis reaction. At this time, in the burning, the entirety of the container body 2 and the lid 3 may be heated or only the portion to be sealed may be locally heated. In the case of the local heating, both the container body 2 and the lid 3 are adjusted to be heated at a uniform temperature.

When the ceramic precursor polymer of polycarbosilane, polycarbosilazane, or polyorganoborosilazane is used as the intermediate material 9, a slurry obtained by dispersing silicon carbide particles in a precursor polymer dissolved in an organic solvent is applied to the respective bonding surfaces of the lid 3 and the cylindrical container body 2 to be sealed with this lid 3. After the slurry is dried, it is burned. This ceramic precursor polymer is excellent in hydrolysis resistance, is ceramized by polycondensation reaction, and is bonded to the substrate. At this time, in the burning, the entirety of the container body 2 and the lid 3 may be heated in an inert atmosphere or only the portion to be sealed may be locally heated in an inert atmosphere. In the case of the local heating, both the container body 2 and the lid 3 are adjusted to be heated at a uniform temperature.

When a carbon adhesive using phenolic resin is used as the intermediate material 9, a carbon adhesive mainly composed of phenolic resin, graphite powder, coke, and pitch is applied to the respective bonding surfaces of the lid 3 and the cylindrical container body 2 to be sealed with this lid 3 and then they are bonded to each other by curing and burning. At this time, in the burning, the entirety of the container body 2 and the lid 3 may be heated in an inert atmosphere or only the portion to be sealed may be locally heated in an inert atmosphere. In the case of the local heating, both the container body 2 and the lid 3 are adjusted to be heated at a uniform temperature.

When a metal brazing material of silver braze, gold braze, platinum braze, palladium braze, phosphorous copper braze, or nickel braze is used as the intermediate material 9, the direct metallization method or the indirect metallizing method is applied to the respective bonding surfaces of the lid 3 and the cylindrical container body 2 to be sealed with this lid 3 for modifying the wettability of the bonding surfaces with respect to a metal brazing material, and then a metal brazing material having a proper shape such as powder, paste, foil, and wire is applied to the bonding surfaces and is heated. At this time, in the brazing, the entirety of the container body 2 and the lid 3 may be heated in an inert atmosphere or only the portion to be sealed may be locally heated in an inert atmosphere. In the case of the local heating, both the container body 2 and the lid 3 are adjusted to be heated at a uniform temperature.

When an inorganic brazing material of glass, silicon, or metal oxide is used as the intermediate material 9, a powdery, pasty, or slurry inorganic brazing material is applied to the respective bonding surfaces of the lid 3 and the cylindrical container body 2 to be sealed with this lid 3, and then it is heated and melted. At this time, in the brazing, the entirety of the container body 2 and the lid 3 may be heated in the atmosphere or in an inert atmosphere. Additionally or alternatively, in the brazing, only the portion to be sealed may be locally heated in the atmosphere or in an inert atmosphere. In the case of the local heating, both the container body 2 and the lid 3 are adjusted to be heated at a uniform temperature.

When both of an inorganic adhesive using a silicate-based or phosphate-based metal alkoxide and a ceramic precursor polymer of polycarbosilane, polycarbosilazane, or polyorganoborosilazane are used as the intermediate material 9, it is preferable that the intermediate material 9 contains 30 to 60 wt % of silicon carbide powder and it is more preferable that the intermediate material 9 contains 30 to 40 wt % of silicon carbide powder. In other words, when the inorganic adhesive and the precursor polymer as the main component occupy 100 wt % of the intermediate material 9, the intermediate material 9 may further contain 30 to 60 wt % (more preferably 30 to 40 wt %) of silicon carbide as an additive. In addition, the intermediate material 9 may be constituted by adding 30 to 60 wt % (more preferably 30 to 40 wt %) of silicon carbide to the precursor polymer (100 wt %). In this manner, by including the silicon carbide powder in the intermediate material 9, it is possible to suppress occurrence of fine cracks caused by size change such as contraction due to burning. Further, by using the intermediate material 9, it is possible to improve the bonding strength between the intermediate material 9 and the lid 3 and to improve the bonding strength between the intermediate material 9 and the container body 2 formed of a material containing silicon carbide. As a result, by using the intermediate material 9, it is also possible to improve the bonding strength between the container body 2 and the lid 3 and to sufficiently secure the adhesion and airtightness of the container body 2 and the lid 3.

The intermediate material 9 is required to have heat resistance, oxidation resistance and resistance to environment. Depending on the physical and chemical properties of various solids, liquids, or gases to be stored or preserved with the use of the container 1, the intermediate material 9 is appropriately selected. That is, in the process of physically or chemically bonding the lid 3 to the container body 2 with the use of the intermediate material 9 and sealing it, the substance to be stored or preserved is required to satisfy the following first to third conditions. The first condition is that the substance to be stored or preserved is not altered. The second condition is that the substance to be stored or preserved does not react with the intermediate material 9. The third condition is that the substance to be stored or preserved does not react with the container 1 and lid 3. In view of these conditions, the intermediate material 9 is appropriately selected.

In the process of physically or chemically adhering/bonding various intermediate materials 9 and sealing the opening 4, it is preferable to locally heat the portion to be sealed and physically or chemically bond the portion to be sealed because the substance contained inside the container 1 is not influenced by heat. As a method of local heating, for instance, laser heating, heating with a heater, heating with an infrared lamp, high-frequency induction heating, and electromagnetic induction heating are used. In addition, it is preferable that both the container body 2 and the lid 3 are heated to a uniform temperature. Further, in order to realize that both the container body 2 and the lid 3 are heated to a uniform temperature, the size and shape of the container body 2 and the lid 3 are appropriately selected.

In the present embodiment, when the container body 2 and the lid 3 are prepared, first, a preforming body (i.e., preform) constituting the composite material is formed. In this process, first, carbon is coated by the CVD method on the surface of silicon carbide monofilaments (e.g., Hynicalon (registered trademark) Type S, made by Nippon Carbon Co., Ltd.) having a diameter of 12 μm. Next, a preforming body of predetermined shape having a thickness of 1.0 mm is produced under the filament winding method by using filament bundles (yarn), in each of which about 500 of the monofilaments are bundled.

Next, a matrix is formed on the preforming body of the composite material. In this process, after setting the preforming body inside the carbon mold in the chemical vapor reactor, material gas (e.g., silicon tetrachloride gas, propane gas, and hydrogen gas) is introduced into the reaction furnace under the condition that the temperature is 1300° C. to 1400° C. and the pressure is 4 to 100 kPa. Thereby, a matrix containing silicon carbide as a main component is formed in the preforming body, and the first composite material having a thickness of 1 mm is prepared. Here, a matrix is formed by the chemical vapor infiltration method between the fibers constituting the preforming body of the composite material, and a silicon carbide matrix is formed by the chemical vapor deposition method in such a manner that the matrix covers the periphery of the preforming body.

Figure 2:
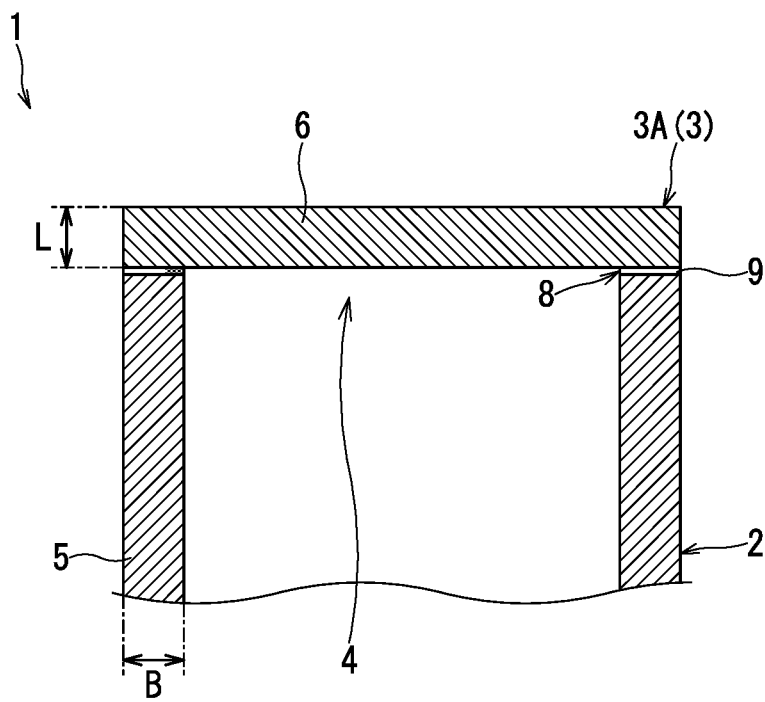
FIG. 2 is a schematic cross-sectional view illustrating a state in which the opening of the container body is closed with the lid of the first example.

As shown in FIG. 2, the lid 3A of the first example has a flat plate shape. This lid 3A is a disc, diameter of which is the same dimension as the diameter of the container body 2. The opening 4 at the end of the container body 2 is closed with the lid 3A. Note that the lid 3A is attached under the state where the intermediate material 9 is applied to the periphery of the opening 4 of the container body 2. That is, the intermediate material 9 is sealed in the gap between the container body 2 and the lid 3A. The container body 2 and the lid 3A are bonded to each other by this intermediate material 9.

In the lid 3A, the thickness L of the wall portion 6 separating its inside and outside is the same dimension as the thickness B (i.e., specific dimension) of the container body 2. The thickness L of this wall portion 6 is uniform throughout. It is sufficient that the thickness L of the lid 3A is not less than 1 times and not more than 3 times the thickness B of the container body 2 (i.e., thickness L is within the range of 1 to 3 times the thickness B). In the first example, since the lid 3A has a flat plate shape, there is no overlap between the container body 2 and the lid 3A.

Note that a groove for interdigitating with the end portion of the container body 2 may be formed on the lid 3A of the first example. In one aspect of a manufacturing process, in the case of forming a groove, a round flat plate of a normal-pressure sintered silicon-carbide ceramics using a boron-carbon based sintering aid is first prepared and then an interdigitation groove is formed. Further, a thin film of silicon carbide is formed by the chemical vapor deposition method so as to cover the side to be sealed.

Figure 3:
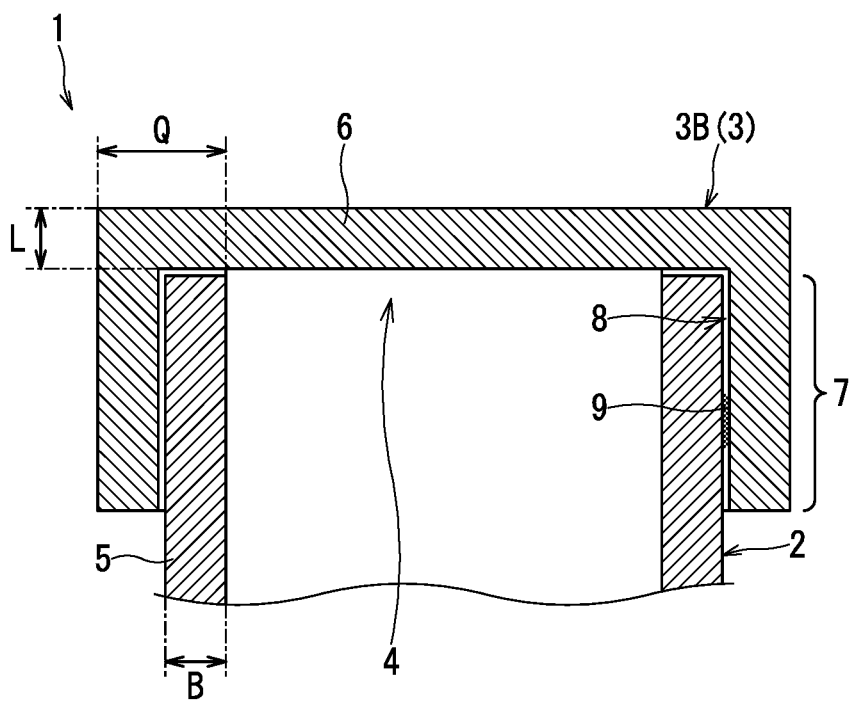
FIG. 3 is a schematic cross-sectional view illustrating a state in which the opening of the container body is closed with the lid of the second example.

As shown in FIG. 3, the lid 3B of the second example is in the form of an outer stopper (i.e., outer plug or cap) that covers the outer periphery of the end portion of the container body 2. The lid 3B forms a bottomed cylindrical shape that has an inner diameter slightly larger than the outer diameter of the container body 2. The end portion of the container body 2 is covered with the lid 3B, whereby the opening portion 4 is closed. Under the state where the opening 4 of the container body 2 is closed with the lid 3B, the intermediate material 9 is used as sealant and adhesive agent to fill the gap 8 between the respective bonding surfaces of the container body 2 and the lid 3B (i.e., portion 7 where the container body 2 and the lid 3B face and overlap each other). By applying the intermediate material 9, the container body 2 and the lid 3B are bonded to each other.

In the lid 3B, the thickness L of the wall portion 6 separating its inside and outside is the same dimension as the thickness B (i.e., specific dimension) of the container body 2. The thickness L of the wall portion 6 is uniform over the entire lid 3B. It is sufficient that the thickness L of the lid 3B is within the range of 1 to 3 times the thickness B of the container body 2.

In addition, under the state where the opening 4 of the container body 2 is closed with the lid 3B, the thickness Q of the portion 7 where the container body 2 and the lid 3B overlap each other is approximately twice the thickness B (i.e., specific dimension) of the container body 2. It is sufficient that the thickness Q of this overlapping portion 7 is within the range of 1 to 3 times the thickness B of the container body 2.

Figure 4:
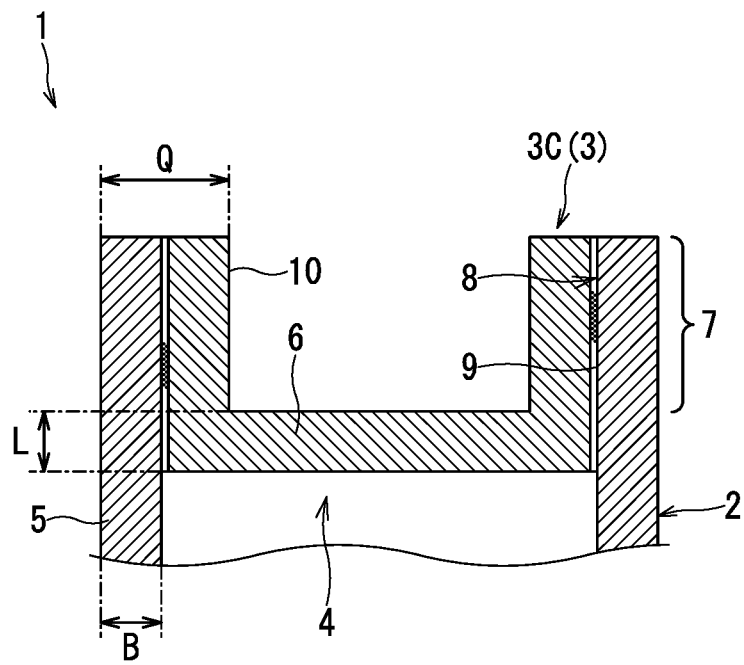
FIG. 4 is a schematic cross-sectional view illustrating a state in which the opening of the container body is closed with the lid of the third example.

As shown in FIG. 4, the lid 3C of the third example is in the form of an inner stopper (i.e., inner plug) that is provided inside the opening 4 of the container body 2. The lid 3C has a bottomed cylindrical shape that has an outer diameter slightly smaller than the inner diameter of the container body 2. That is, a hollow portion 10 recessed inward of the container body 2 is formed in the central portion of the lid 3C. By causing the lid 3C to fit into (i.e., interdigitate with) the opening 4 of the container body 2, the opening 4 is closed. Under the state where the opening 4 of the container body 2 is closed with the lid 3C, the intermediate material 9 is used as sealant and adhesive agent to fill the gap 8 between the respective bonding surfaces of the container body 2 and the lid 3C (i.e., portion 7 where the container body 2 and the lid 3C face and overlap each other). By applying the intermediate material 9, the container body 2 and the lid 3C are bonded to each other. Further, by fitting the lid 3C into the opening 4 of the container body 2, it is possible to improve airtightness and mechanical strength of the opening 4 of the container body 2.

In the lid 3C, the thickness L of the wall portion 6 separating its inside and outside is the same dimension as the thickness B (i.e., specific dimension) of the container body 2. The thickness L of this wall portion 6 is uniform over the entire lid 3C. It is sufficient that the thickness L of the lid 3C is within the range of 1 to 3 times the thickness B of the container body 2.

In addition, under the state where the opening 4 of the container body 2 is closed with the lid 3C, the thickness Q of the portion 7 where the container body 2 and the lid 3C overlap each other is approximately twice the thickness B (i.e., specific dimension) of the container body 2. It is sufficient that the thickness Q of this overlapping portion 7 is within the range of 1 to 3 times the thickness B of the container body 2.

Figure 5:
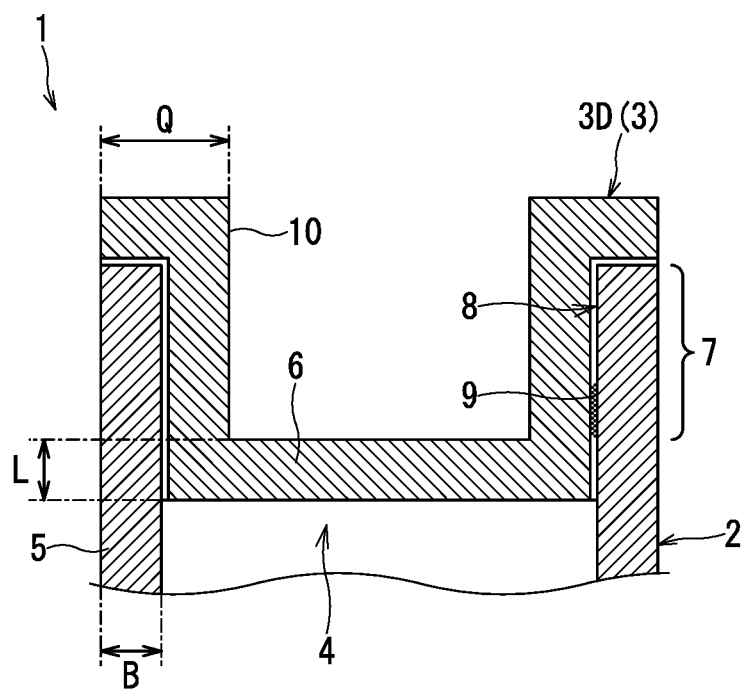
FIG. 5 is a schematic cross-sectional view illustrating a state in which the opening of the container body is closed with the lid of the fourth example.

As shown in FIG. 5, the lid 3D of the fourth example fits into the opening 4 of the container body 2 and is in the form of an inner stopper (i.e., inner plug) that covers the end portion and/or peripheral edge of the opening 4. This lid 3D forms a bottomed cylindrical shape that has an outer diameter slightly smaller than the inner diameter of the container body 2. That is, a hollow portion 10 recessed inward of the container body 2 is formed in the central portion of the lid 3D. By causing the lid 3D to fit into (i.e., interdigitate with) the opening 4 of the container body 2, the opening 4 is closed. Under the state where the opening 4 of the container body 2 is closed with the lid 3D, the intermediate material 9 is used as sealant and adhesive agent to fill the gap 8 between the respective bonding surfaces of the container body 2 and the lid 3D (i.e., portion 7 where the container body 2 and the lid 3D face and overlap each other). By applying the intermediate material 9, the container body 2 and the lid 3D are bonded to each other. Further, by fitting the lid 3D into the opening 4 of the container body 2, it is possible to improve airtightness and mechanical strength of the opening 4 of the container body 2.

In the lid 3D, the thickness L of the wall portion 6 separating its inside and outside is the same dimension as the thickness B (i.e., specific dimension) of the container body 2. The thickness L of this wall portion 6 is uniform over the entire lid 3D. It is sufficient that the thickness L of the lid 3D is within the range of 1 to 3 times the thickness B of the container body 2.

In addition, under the state where the opening 4 of the container body 2 is closed with the lid 3D, the thickness Q of the portion 7 where the container body 2 and the lid 3D overlap each other is approximately twice the thickness B (i.e., specific dimension) of the container body 2. It is sufficient that the thickness Q of this overlapping portion 7 is within the range of 1 to 3 times the thickness B of the container body 2.

Figure 6:
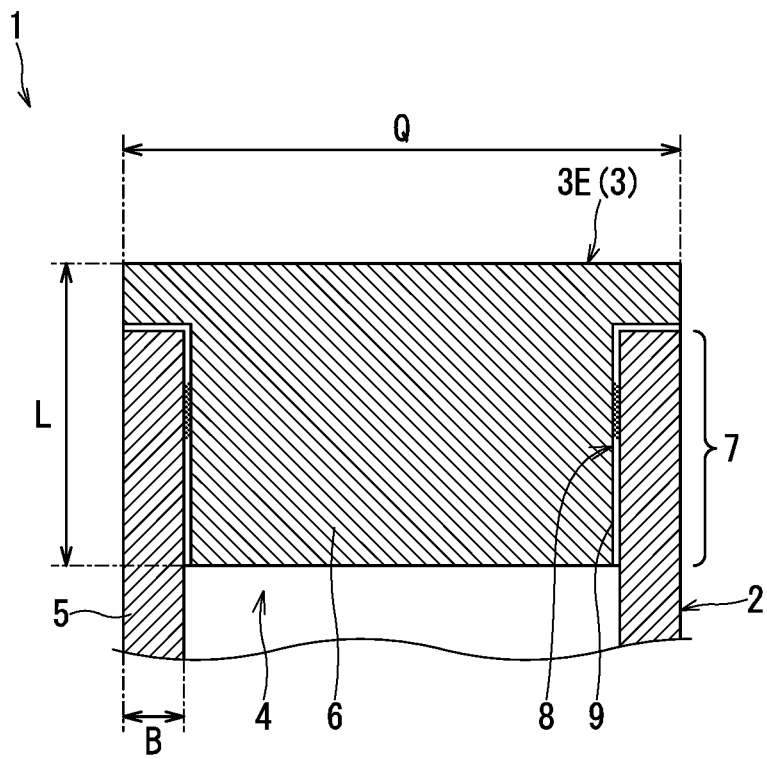
FIG. 6 is a schematic cross-sectional view illustrating a state in which the opening of the container body is closed with the lid of the first comparative example.

As shown in FIG. 6, the lid 3E of the fifth comparative example fits into (i.e., interdigitates with) the opening 4 of the container body 2, covers the end portion (peripheral edge) of the opening 4, and forms a solid stopper (i.e., solid plug) shape in which the above-described hollow portion 10 is not formed. By causing the lid 3E to fit into the opening 4 of the container body 2, the opening 4 is closed. Under the state where the opening 4 of the container body 2 is closed with the lid 3E, the intermediate material 9 is used as sealant and adhesive agent to fill the gap 8 between the respective bonding surfaces of the container body 2 and the lid 3E (i.e., portion 7 where the container body 2 and the lid 3E face and overlap each other). By applying the intermediate material 9, the container body 2 and the lid 3E are bonded to each other. Further, by fitting the lid 3E into the opening 4 of the container body 2, it is possible to improve airtightness and mechanical strength of the opening 4 of the container body 2.

In the lid 3E, the thickness L of the wall portion 6 separating its inside and outside is approximately five times the thickness B (i.e., specific dimension) of the container body 2. In addition, under the state where the opening 4 of the container body 2 is closed with the lid 3E, the thickness Q of the portion 7 where the container body 2 and the lid 3E overlap each other is approximately 9 times the thickness B (i.e., specific dimension) of the container body 2.

As shown in FIG. 7, the lid 3F of the fifth example is in the form of an outer stopper (i.e., outer plug or outer cap) that covers the outer periphery of the end portion of the container body 2. The lid 3F forms a bottomed cylindrical shape, and has an inner diameter slightly larger than the outer diameter of the container body 2.

On the outer surface of the container body 2, a screw cutting 11 is formed at the bonding portion 7 where the container body 2 faces and overlaps the lid 3F. Similarly, on the inner surface of the lid 3F, a screw cutting 12 is formed at the bonding portion 7 where the lid 3F faces and overlaps the container body 2 such that the screw cuttings 11 and 12 mesh with each other. Further, the opening portion 4 is closed by screwing the lid 3F onto the container body 2 so that the screw cutting 12 of the lid 3F meshes with the screw cutting 11 of the container body 2. Under the state where the opening 4 of the container body 2 is closed with the lid 3F, the intermediate material 9 is used as sealant and adhesive agent to fill the gap 8 between the respective bonding surfaces of the container body 2 and the lid 3F (i.e., portion 7 where the container body 2 and the lid 3F face and overlap each other). Further, by screwing the lid 3F onto the opening 4 of the container body 2, it is possible to improve airtightness and mechanical strength of the opening 4 of the container body 2. The protrusions (i.e., apexes) of the respective screw cuttings 11 and 12 are subjected to C chamfering or round chamfering in order to alleviate stress concentration, and the same holds true for FIG. 8 to FIG. 11B as described below.

In the lid 3F, the thickness L of the wall portion 6 separating its inside and outside is the same dimension as the thickness B (i.e., specific dimension) of the container body 2. The thickness L of this wall portion 6 is uniform over the entire lid 3F. It is sufficient that the thickness L of the lid 3F is within the range of 1 to 3 times the thickness B of the container body 2.

In addition, under the state where the opening 4 of the container body 2 is closed with the lid 3F, the thickness Q of the portion 7 where the container body 2 and the lid 3F overlap each other is approximately twice the thickness B (i.e., specific dimension) of the container body 2. It is sufficient that the thickness Q of this overlapping portion 7 is within the range of 1 to 3 times the thickness B of the container body 2.

Figure 8:
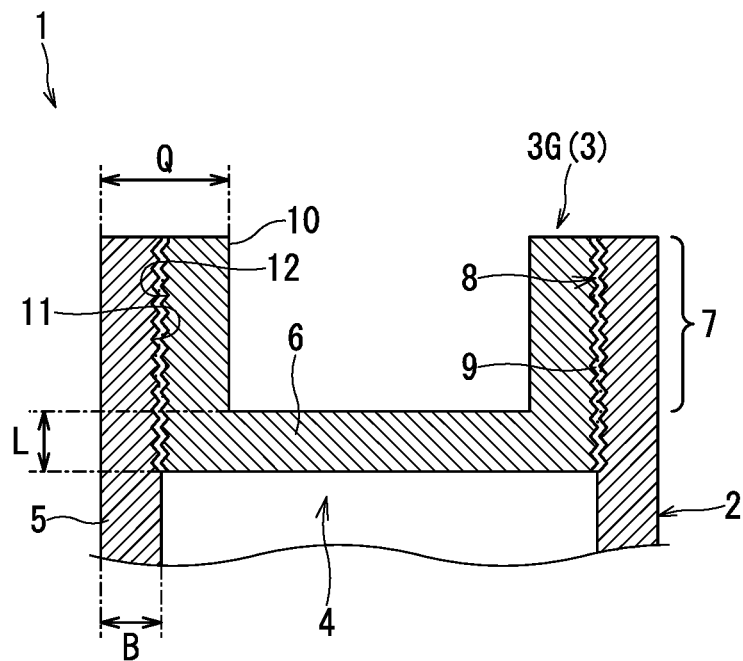
FIG. 8 is a schematic cross-sectional view illustrating a state in which the opening of the container body is closed with the lid of the sixth example.

As shown in FIG. 8, the lid 3G of the sixth example is in the form of an inner stopper (i.e., inner plug) that is provided inside the opening 4 of the container body 2. The lid 3G has a bottomed cylindrical shape that has an outer diameter slightly smaller than the inner diameter of the container body 2. In other words, a hollow portion 10 recessed toward the inside of the container body 2 is formed in the central portion of the lid 3G.

On the inner surface of the container body 2, a screw cutting 11 is formed at the bonding portion 7 where the container body 2 faces and overlaps the lid 3G. Similarly, on the lateral surface of the lid 3G, a screw cutting 12 is formed at the bonding portion 7 where the lid 3F faces and overlaps the container body 2 such that the screw cuttings 11 and 12 mesh with each other. Further, the opening portion 4 is closed by screwing the lid 3G onto the container body 2. Under the state where the opening 4 of the container body 2 is closed with the lid 3G, the intermediate material 9 is used as sealant and adhesive agent to fill the gap 8 between the respective bonding surfaces of the container body 2 and the lid 3G (i.e., portion 7 where the container body 2 and the lid 3G face and overlap each other). Further, by screwing the lid 3G onto the opening 4 of the container body 2, it is possible to improve airtightness and mechanical strength of the opening 4 of the container body 2.

In the lid 3G, the thickness L of the wall portion 6 separating its inside and outside is the same dimension as the thickness B (i.e., specific dimension) of the container body 2. The thickness L of this wall portion 6 is uniform over the entire lid 3G. It is sufficient that the thickness L of the lid 3G is within the range of 1 to 3 times the thickness B of the container body 2.

In addition, under the state where the opening 4 of the container body 2 is closed with the lid 3G, the thickness Q of the portion 7 where the container body 2 and the lid 3G overlap each other is approximately twice the thickness B (i.e., specific dimension) of the container body 2. It is sufficient that the thickness Q of this overlapping portion 7 is within the range of 1 to 3 times the thickness B of the container body 2.

Figure 9:
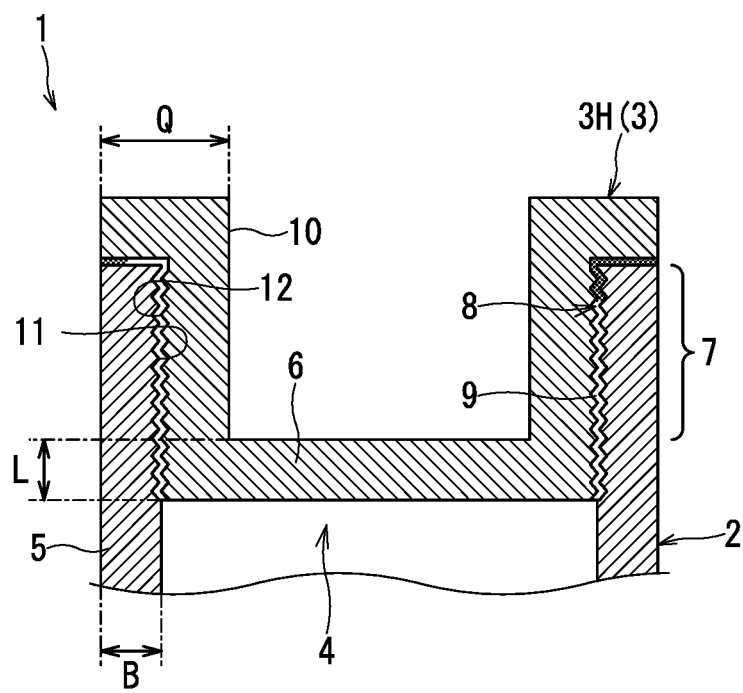
FIG. 9 is a schematic cross-sectional view illustrating a state in which the opening of the container body is closed with the lid of the seventh example.

As shown in FIG. 9, the lid 3H of the seventh example fits into the opening 4 of the container body 2 and is in the form of an inner-and-outer stopper (i.e., inner-and-outer plug) that covers the end portion (peripheral edge) of the opening 4. The lid 3H forms a bottomed cylindrical shape that has an outer diameter slightly smaller than the inner diameter of the container body 2. In other words, a hollow portion 10 recessed toward the inside of the container body 2 is formed in the central portion of the lid 3H.

On the inner surface of the container body 2, a screw cutting 11 is formed at the bonding portion 7 where the container body 2 faces and overlaps the lid 3H. Similarly, on the lateral surface of the lid 3H, a screw cutting 12 is formed at the bonding portion 7 where the lid 3H faces and overlaps the container body 2 such that the screw cuttings 11 and 12 mesh with each other. Further, the opening portion 4 is closed by screwing the lid 3H onto the container body 2. Under the state where the opening 4 of the container body 2 is closed with the lid 3H, the intermediate material 9 is used as sealant and adhesive agent to fill the gap 8 between the respective bonding surfaces of the container body 2 and the lid 3H (i.e., portion 7 where the container body 2 and the lid 3H face and overlap each other). Further, by screwing the lid 3H onto the opening 4 of the container body 2, it is possible to improve airtightness and mechanical strength of the opening 4 of the container body 2.

In the lid 3H, the thickness L of the wall portion 6 separating its inside and outside is the same dimension as the thickness B (i.e., specific dimension) of the container body 2. The thickness L of this wall portion 6 is uniform over the entire lid 3H. It is sufficient that the thickness L of the lid 3H is within the range of 1 to 3 times the thickness B of the container body 2.

In addition, under the state where the opening 4 of the container body 2 is closed with the lid 3H, the thickness Q of the portion 7 where the container body 2 and the lid 3H overlap each other is approximately twice the thickness B (i.e., specific dimension) of the container body 2. It is sufficient that the thickness Q of this overlapping portion 7 is within the range of 1 to 3 times the thickness B of the container body 2.

Each of the lid 3D (FIG. 5) of the fourth example and the lid 3H (FIG. 9) of the seventh example covers the end portion (peripheral edge) of the opening 4 of the container body 2. By configuring the lid 3D and the lid 3H in this manner, the end portion of the container body 2 can be protected. For instance, in the case of manufacturing a long container body 2, first, a container body 2 longer than the required dimension is formed. Next, the end portion is cut such that the dimension of the container body 2 in the longitudinal direction is adjusted. In other words, the monofilaments are exposed to the outside on the end portion of the container body 2 (i.e., the surface of the periphery of the opening 4). By covering this end portion with the lid 3, exposure of the monofilaments can be prevented.

Figure 10:
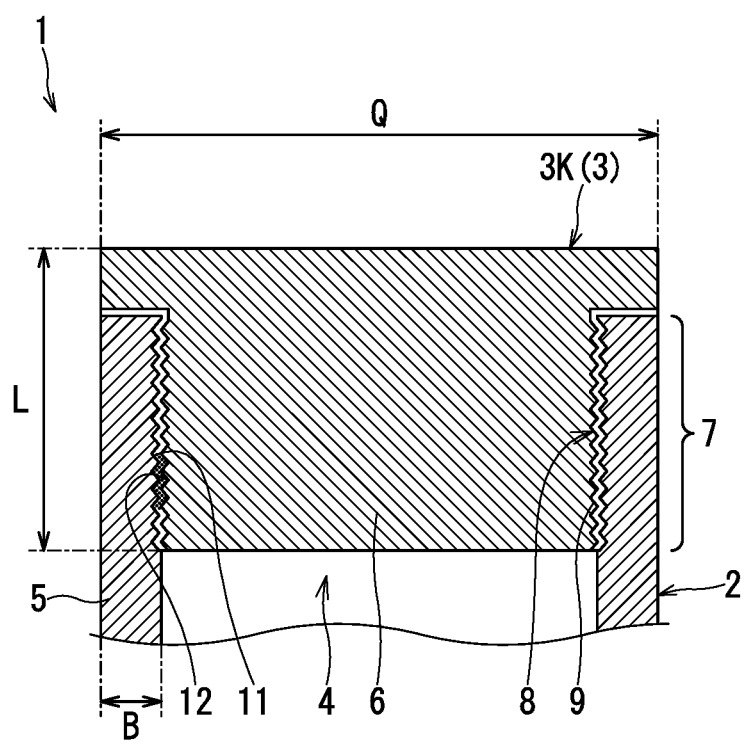
FIG. 10 is a schematic cross-sectional view illustrating a state in which the opening of the container body is closed with the lid of the second comparative example.

As shown in FIG. 10, the lid 3K of the second comparative example fits into (i.e., interdigitates with) the opening 4 of the container body 2, covers the end portion (i.e., peripheral edge) of the opening 4, and is in the form of an inner-and-outer solid stopper (i.e., inner-and-outer solid plug) in which the above-described hollow portion 10 is not formed.

On the inner surface of the container body 2, a screw cutting 11 is formed at the bonding portion 7 where the container body 2 faces and overlaps the lid 3K. Similarly, on the lateral surface of the lid 3K, a screw cutting 12 is formed at the bonding portion 7 where the lid 3K faces and overlaps the container body 2 such that the screw cuttings 11 and 12 mesh with each other. Further, the opening portion 4 is closed by screwing the lid 3K onto the container body 2. Under the state where the opening 4 of the container body 2 is closed with the lid 3K, the intermediate material 9 is used as sealant and adhesive agent to fill the gap 8 between the respective bonding surfaces of the container body 2 and the lid 3K (i.e., portion 7 where the container body 2 and the lid 3K face and overlap each other). Further, by screwing the lid 3K onto the opening 4 of the container body 2, it is possible to improve airtightness and mechanical strength of the opening 4 of the container body 2.

In the lid 3K, the thickness L of the wall portion 6 separating its inside and outside is approximately five times the thickness B (i.e., specific dimension) of the container body 2. In addition, under the state where the opening 4 of the container body 2 is closed with the lid 3K, the thickness Q of the portion 7 where the container body 2 and the lid 3K overlap each other is approximately 9 times the thickness B (i.e., specific dimension) of the container body 2.

Each of the lids 3E and 3K of the first and second comparative examples is larger in volume and mass than the lids 3 of the first to seventh examples, and thus is more prone to cracks due to temperature change than the lids 3 of the first to seventh examples.

In the present embodiment, it is satisfactory that the thickness Q of the portion 7 where the container body 2 and the lid 3 overlap each other is within the range of 1 to 3 times the thickness B (i.e., specific dimension) of the container body 2 in the state of closing the opening 4 of the container body 2 with the lid 3. By satisfying this condition, when the portion 7 where the container body 2 and the lid 3 overlap each other expands or shrinks due to temperature change, its expansion rate or shrinkage rate becomes close to the wall portion 5 of the container body 2 and thus it is possible to improve resistance to temperature change of the portion 7 where the container body 2 and the lid 3 overlap each other.

It is sufficient that the thickness of the portion of the container body 2 overlapping with the lid 3 is 0.5 times or more and 2 times or less of the thickness of the other portion. In addition, it is sufficient that the thickness of the portion of the lid 3 overlapping with the container body 2 is 0.5 times or more and 2 times or less of the thickness of the other portion.

In each of the above-described examples, the thickness L of the wall portion 6 of the lid 3 may be within the range of 1.2 to 2.5 times the thickness B of the wall portion 5 of the container body 2. Further, in the state of closing the opening 4 of the container body 2 with the lid 3, the thickness Q of the portion 7 where the container body 2 and the lid 3 overlap each other may be within the range of 1.2 to 2.5 times the thickness B (i.e., specific dimension) of the container body 2.

When the thickness Q of the portion 7 where the container body 2 and the lid 3 overlap each other is thinner than the lower limit value of the above-described range, mechanical properties, heat resistance, oxidation resistance, and resistance to environment of the container 1 are insufficient in some cases. Conversely, when the thickness Q of the portion 7 is larger than the upper limit of the above-described range, its manufacturability is deteriorated, which consequently leads to deterioration in mechanical and thermal characteristics such as rise in porosity inside the container 1 and reduction in strength and reduction in thermal conductivity in some cases. In these cases, mechanical characteristics or resistance to environment is insufficient. In the present embodiment, such a problem can be solved.

Also in the case of sealing the opening 4 with the lid 3, the thickness L of the wall portion 6 of the lid 3 is adjusted so as to be close to the thickness B of the wall portion 5 of the container body 2, and the thickness Q of the portion 7 where the container body 2 and the lid 3 overlap each other is also adjusted so that the container 1 has a uniform thickness as a whole. This adjustment makes it possible to avoid change in characteristics of the container 1 due to temperature change such as specific heat, thermal expansion, and thermal conductivity even in a high-temperature environment.

In the present embodiment, the screw cuttings 11 and 12 are respectively formed on the container body 2 and the lid 3 such that the lid 3 is screwed onto the container body 2, whereby the bonding strength between the container body 2 and the lid 3 can be improved.

Figure 11A:
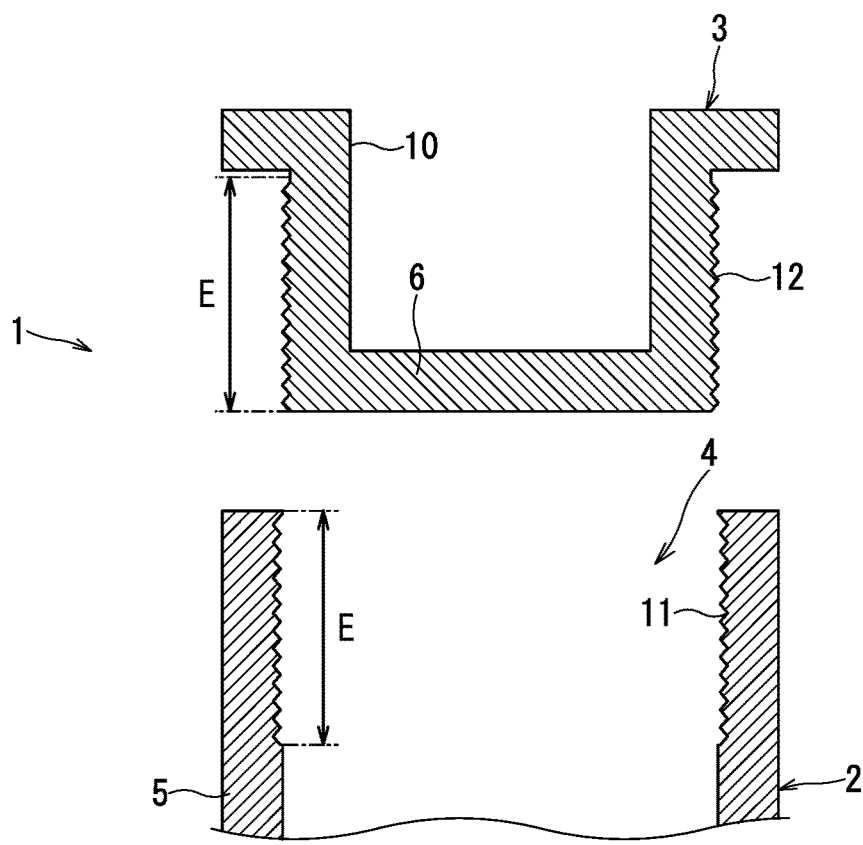
FIG. 11A is a schematic cross-sectional view illustrating a state before closing, in the process of closing the opening of the container body with the lid.
Figure 11B:
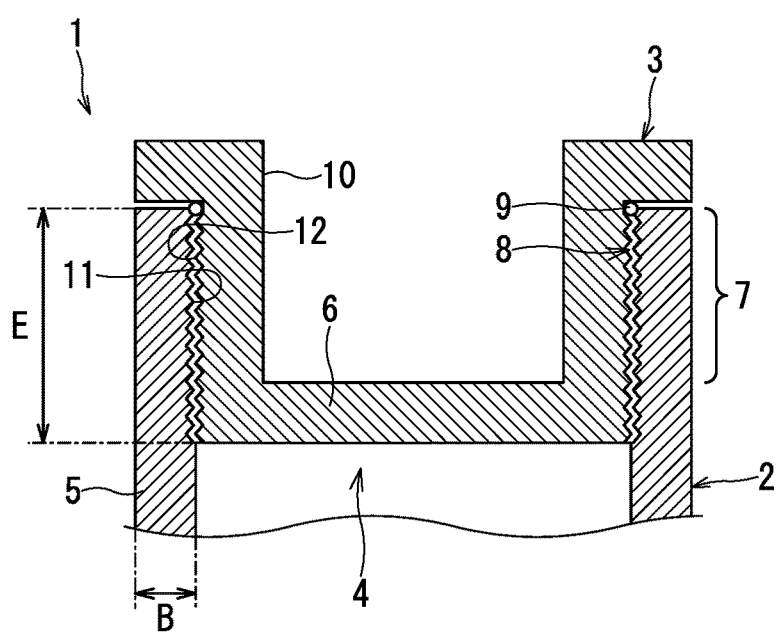
FIG. 11B is a schematic cross-sectional view illustrating a state after closing, in the process of closing the opening of the container body with the lid.

FIG. 11A and FIG. 11B illustrate the process of closing the opening 4 of the container body 2 with the lid 3. As the intermediate material 9, a metal brazing material is exemplified. As shown in FIG. 11A, in the present embodiment, the screw cuttings 11 and 12 are formed on the bonding surfaces of the portion 7 where the container body 2 and the lid 3 face and overlap each other.

As shown in FIG. 11B, when a metal brazing material is used as the intermediate material 9, metallization is preliminarily performed on a predetermined range E on the bonding surfaces of the portion 7 where the container body 2 and the lid 3 face and overlap each other. This metallization is applied to both the container body 2 and the lid 3. The metallization may be either a direct metallization method or an indirect metallization method. By this metallization, wettability of the bonding surfaces with respect to the metal brazing material is reformed.

Next, when the lid 3 is screwed onto the end portion of the container body 2, a wire-shaped intermediate material 9 is applied to the gap 8 between the respective bonding surface of the container body 2 and the lid 3 (i.e., portion 7 the container body 2 and the lid 3 overlap each other). Thereafter, the container body 2 and the lid 3 are heated so that the wire-shaped intermediate material 9 is melted.

The molten intermediate material 9 enters the gap 8 by capillary action (FIG. 9). It should be noted that this intermediate material 9 enters the metallization-applied range E and remains in this range E. Accordingly, the intermediate material 9 is applied so as to fill the gap 8 between the respective bonding surface of the container body 2 and the lid 3. Note that the gap 8 is a vacant space (i.e., interspace) positioned at the portion 7 where the container body 2 and the lid 3 face each other. In this manner, the entry range E of the intermediate material 9 can be set in advance by metallization. Thus, the intermediate material 9 will not spread to unnecessary regions. Thereafter, by cooling the container body 2 and the lid 3, the intermediate material 9 is solidified.

Note that an active silver braze may be used as the intermediate material 9. For instance, after applying screw cutting to the respective bonding surfaces of the container body 2 and the lid 3 facing each other across the gap 8, pasty active silver braze is applied to the bonding surfaces. Next, both the container body 2 and the lid 3 are uniformly heated at a temperature of 780° C. to 800° C. Further, a ceramic heater is used for this heating while this heating is gas-shielded.

In addition, nickel braze may be used as the intermediate material 9. For instance, after applying screw cutting to the respective bonding surfaces of the container body 2 and the lid 3 facing each other across the gap 8, a film containing at least any one of titanium, nickel, and chromium is formed on each of the bonding surfaces by a vapor deposition method. Note that the films may be formed by a single substance of these materials or a combination of plural materials. Next, sheet-shaped nickel braze is applied. Next, both the container body 2 and the lid 3 are uniformly heated at a temperature of 925° C. to 1010° C. Further, a ceramic heater is used for this heating while this heating is gas-shielded.

Next, a method of closing the opening 4 in the container 1 will be described with reference to the flowchart of FIG. 12.

First, the specific dimension of the thickness B of the wall portion 5 of the container body 2 is determined on the basis of various conditions such as the use of the container 1 and the use environment.

Figure 12:
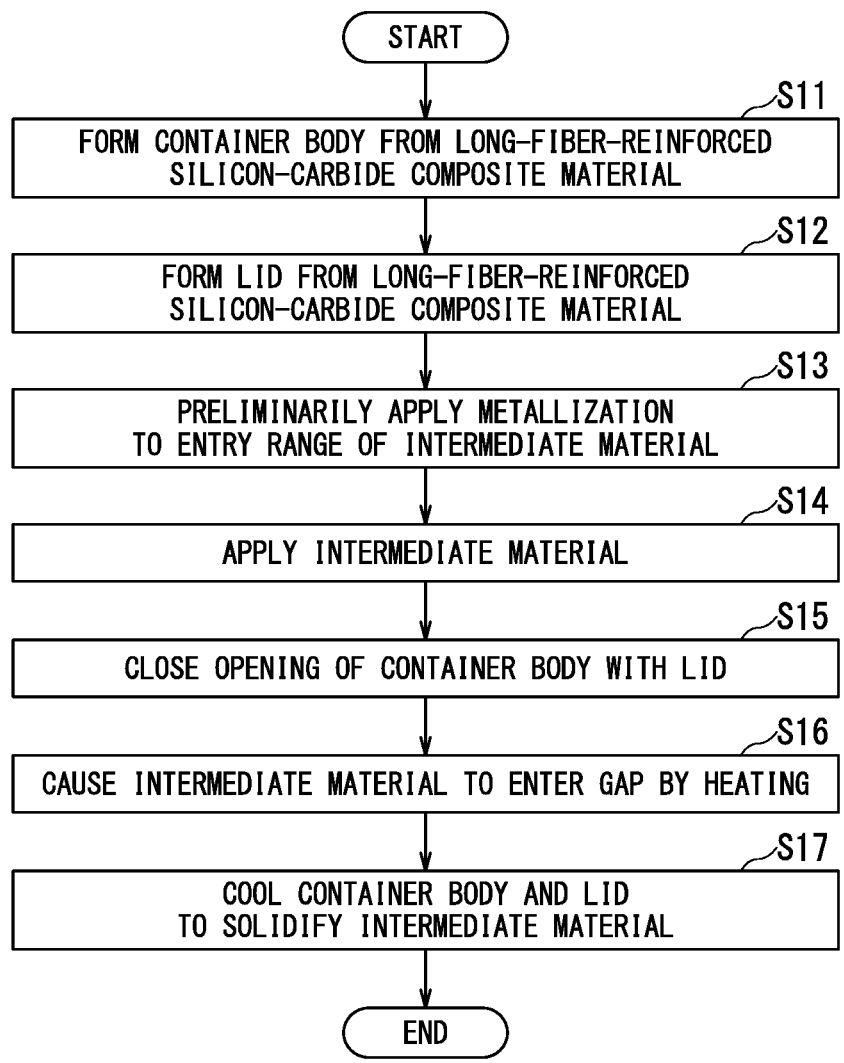
FIG. 12 is a flowchart illustrating a method for closing an opening of a container.

Next, in the step S11 of FIG. 12, the container body 2 is formed of a long-fiber-reinforced silicon-carbide composite material.

In the next step S12, the thickness L of the wall portion 6 of the lid 3 is determined on the basis of the specific dimension, and then the lid 3 is formed of a long-fiber-reinforced silicon-carbide composite material.

In the next step S13, when a metal braze material is used as the intermediate material 9, metallization is preliminarily applied to the entry range E of the intermediate material 9 at the portion 7 where the container body 2 and the lid 3 overlap each other. Note that it is not necessary to pre-metallize the entry range E of the intermediate material 9 except when a metal braze material is used. When a metal braze material is not used, this metallization process (i.e., step S13) may be omitted.

In the next step S14, the intermediate material 9 is applied in the vicinity of the respective bonding surfaces of the portion 7 where the container body 2 and the lid 3 overlap each other across the gap 8.

In the next step S15, the opening 4 of the container body 2 is closed with the lid 3.

In the next step S16, the container body 2 and the lid 3 are heated to melt the intermediate material 9, and the melted intermediate material 9 is caused to enter the gap 8 between the container body 2 and the lid 3 by the capillary phenomenon.

In the next step S17, the container body 2 and the lid 3 are cooled to solidify the intermediate material 9, and the entire process is completed.

Samples of each example and each comparative example were prepared and subjected to a bonding strength test, a sealing performance test, and an environmental resistance test. For each example and each comparative example, the table of FIG. 13 shows the shape of each lid 3, presence/absence of the screw cuttings 11 and 12, presence/absence of the intermediate material 9, bonding strength between the container body 2 and each lid 3 (as one of mechanical characteristics), airtightness of the container 1, and resistance to environment of the container 1. The test result shown in FIG. 13 is only one case and embodiments of the present invention are not limited to this test result.

The test of FIG. 13 is performed on the samples including the eighth example, the ninth example, the tenth example, and the third comparative example in addition to the above-described first to seventh examples and the first and second comparative examples. Note that the configuration of the eighth to tenth examples and the third comparative example are not illustrated. In the eighth example, the lid 3F in the form of an outer stopper is screwed onto the container body 2 without using the intermediate material 9. In the ninth example, the lid 3G in the form of an inner stopper is screwed onto the container body 2 without using the intermediate material 9. In the tenth example, the lid 3H in the form of an inner-and-outer stopper is screwed onto the container body 2 without using the intermediate material 9. In the third comparative example, the lid 3K in the form of an inner-and-outer solid stopper is screwed onto the container body 2 without using the intermediate material 9.

The resistance to environment indicates resistance to temperature change. As an environmental resistance test, an superheated steam test was performed. The superheated steam test was performed by using an autoclave under test conditions of temperature of 360° C., water vapor pressure of 0.2 MPa, holding time of 1 week. The test method conforms to Japanese Industrial Standards.

In addition, the bonding strength between the container body 2 and the lid 3 was measured by performing a tensile strength test at room temperature. By comparing each measured value of the tensile strength test with a predetermined threshold value, it is determined as to whether the bonding strength was satisfactory (i.e., good) or unsatisfactory (i.e., poor). On the basis of the occurrence of cracks, it is determined as to whether the resistance to environment is satisfactory or unsatisfactory.

As shown in this test result, the respective containers 1 using the lids 3 of the fifth to seventh examples have a satisfactory result in all of the bonding strength, airtightness, and resistance to environment. By contrast, the respective containers 1 using the lids 3 of the first to third comparative examples have unsatisfactory resistance to environment. In the respective lids 3 of the first to third comparative examples, it was not able to withstand temperature change, resulting in occurrence of cracks.

As shown in the lid 3 of each of the first to third comparative examples, it is found that a crack is generated without being able to withstand temperature change when the thickness L (FIG. 6 and FIG. 10) of the wall portion 6 separating its inside and outside is 4 times or more of the thickness B (i.e., specific dimension) of the container body 2. Further, it is found that a crack is generated without being able to withstand temperature change when the thickness L of the wall portion 6 is 3 times or more of the thickness B, more precisely, a crack is generated when the thickness L is 2.5 times or more of the thickness B.

Additionally, it is found that a crack is generated without being able to withstand temperature change when the thickness Q (FIG. 6 and FIG. 10) of the wall portion 7 where the container body 2 overlaps the lid 3 is 4 times or more of the thickness B (i.e., specific dimension) of the container body 2 in the state of closing the opening 4 of the container body 2 with the lid 3. Further, it is found that a crack is generated without being able to withstand temperature change when the thickness Q of the wall portion 7 is 3 times or more of the thickness B in the state of closing the opening 4 with the lid 3, more precisely, a crack is generated when the thickness Q is 2.5 times or more of the thickness B in the state of closing the opening 4 with the lid 3.

When the thickness Q (FIG. 6 and FIG. 10) of the wall portion 7 where the container body 2 overlaps the lid 3 is less than 1 times of the thickness B (i.e., specific dimension) of the container body 2, the strength required for the intended use of the container 1 cannot be maintained. More precisely, when the thickness Q of the wall portion 7 is less than 1.2 times of the thickness B (i.e., specific dimension), the strength required for the intended use of the container 1 cannot be maintained. In the present embodiment, such a problem can be solved.

The table of FIG. 16 shows the result of the thermal shock test performed on the test specimens. In this test, plural types of specimens were prepared, and these specimens were the same in shape but were different in thicknesses of the lid 3 with respect to the container body 2 from each other. In this test, the respective specimens were heated at 500° C., and then dropped into water while maintaining this temperature. Thereafter, by performing a fluorescent flaw detection test, it was checked whether a crack was generated in each specimen or not. A helium leak test was additionally performed on the specimens, which were found not to have a crack as a result of this detection test, in order to evaluate the airtightness. Containers having the shape of the sixth example (FIG. 8) of the present embodiment were used as the respective test specimens.

The first test specimen was prepared such that the thickness L of the wall portion 6 of the lid 3 became 0.5 times the thickness B of the container body 2.

The second test specimen was prepared such that the thickness L of the wall portion 6 of the lid 3 became 1 times the thickness B of the container body 2.

The third test specimen was prepared such that the thickness L of the wall portion 6 of the lid 3 became 2 times the thickness B of the container body 2.

The fourth test specimen was prepared such that the thickness L of the wall portion 6 of the lid 3 became 3 times the thickness B of the container body 2.

The fifth test specimen was prepared such that the thickness L of the wall portion 6 of the lid 3 became 4 times the thickness B of the container body 2.

The sixth test specimen was prepared such that the thickness L of the wall portion 6 of the lid 3 became 5 times the thickness B of the container body 2.

As a result of performing the thermal shock test, a crack occurred in the sixth test specimen. The helium leak test was additionally performed on the first to fifth test specimens in which a crack was not generated in the thermal shock test. By setting the threshold value to $1\times10^{-9}$ Pa·m³/s that is the detection limit value of the detection device for detecting a leak amount, each test specimen having a leak amount equal to or less than the detection limit value was determined as acceptable (i.e., satisfactory), while the rest of the specimens were rejected (i.e., determined as unsatisfactory). The second, third, and fourth test specimens were determined as acceptable. It is confirmed from this test result that the thickness L of the wall portion 6 of the lid 3 is preferably within the range of 1 to 3 times the wall thickness B of the container body 2.

Test specimens were also prepared for the respective containers of the second, third, fourth, fifth, and seventh examples of the present embodiment, and the thermal shock test and the helium leak test were performed in the same manner as described above. As a result, it is confirmed that the thickness L of the wall portion 6 of the lid 3 is preferably not less than 1 time and not more than 3 times the wall thickness B of the container body 2.

Figure 14:
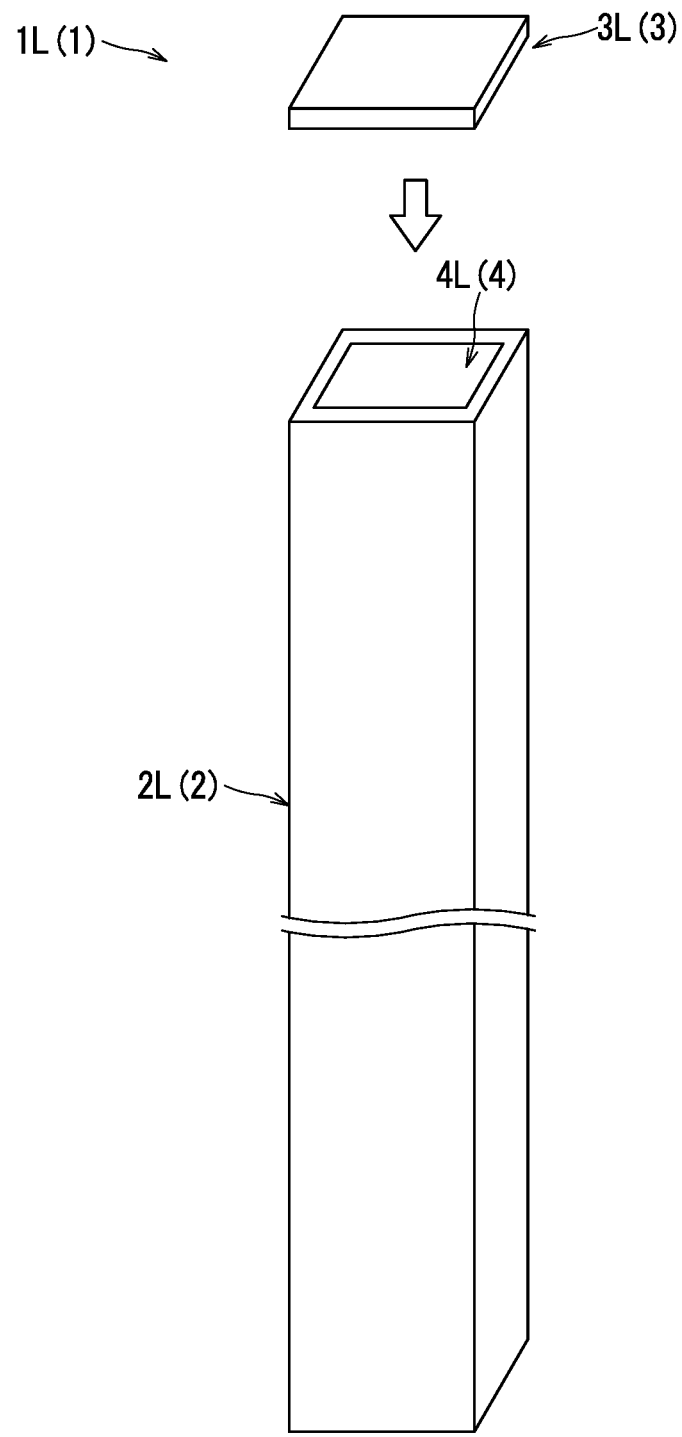
FIG. 14 is a perspective view illustrating a container body and a lid of a first modification.

Although a description has been given of the case where the shape of the container body 2 is cylindrical in the above-described embodiment, the container body 2 may be in the form of another shape. For instance, as shown by the container 1L of the first modification 1 in FIG. 14, its container body 2L may have a square tubular shape. An opening 4L at the end portion of the container body 2L is closed with a lid 3L having a flat plate shape.

The lid 3L of the first modification has a quadrangular shape in a plan view and is formed in the same shape as the shape of the end portion of the container body 2L. In addition, the shape of the opening 4L also has a quadrangular shape. Further, the thickness (of the wall portion) of the lid 3L is the same as the wall thickness (i.e., specific size) of the container body 2L. The thickness of the lid 3L is uniform over the entirety of the lid 3L. It is sufficient that the thickness of the lid 3L is within the range of 1 to 3 times the thickness of the wall portion of the container body 2L. In addition, the lid 3L is attached under the state where an intermediate material is applied to the periphery of the opening 4L of the container body 2L. In other words, the container body 2L and the lid 3L are bonded to each other by this intermediate material. Further, in a plan view, the four corners of the container body 2L may be formed in a curved shape, which improves the mechanical strength and resistance to environment of the container 1L.

Figure 15:
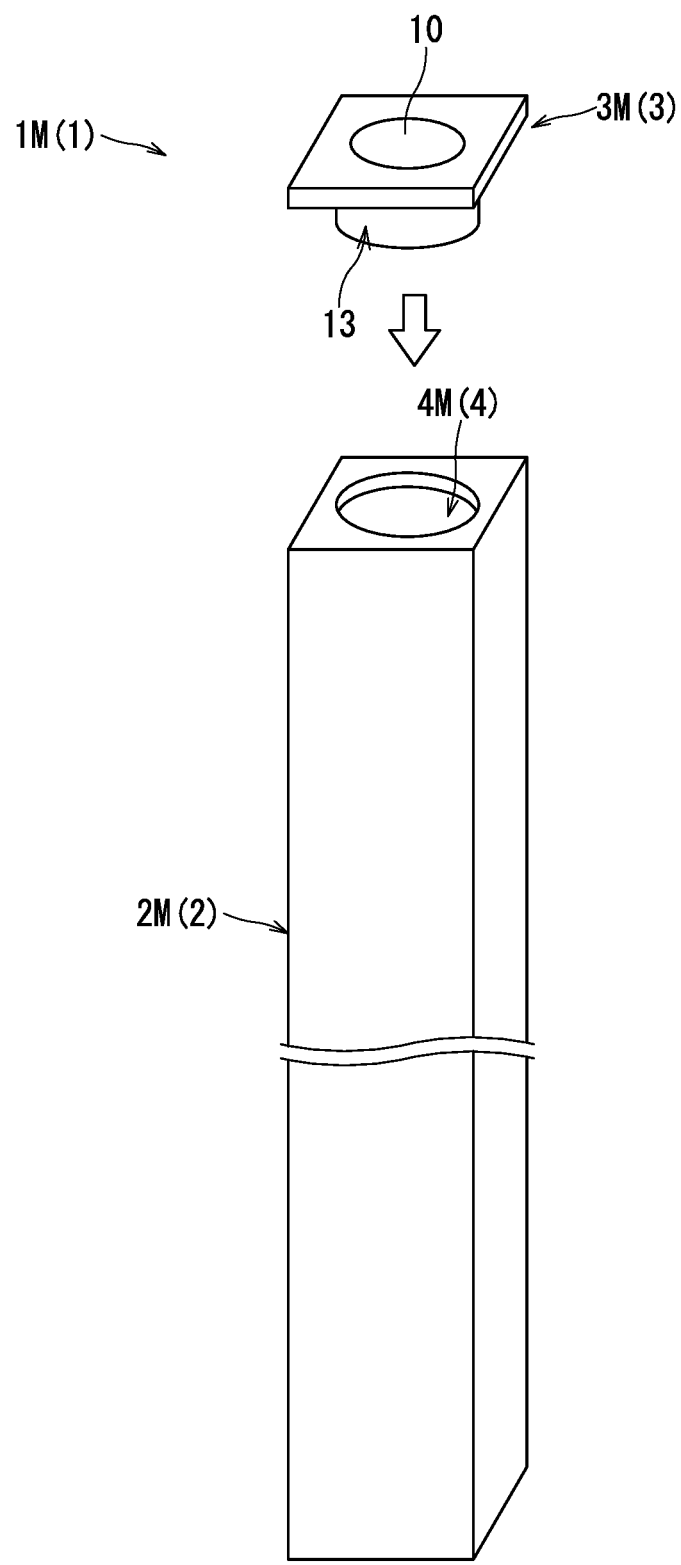
FIG. 15 is a perspective view illustrating a container body and a lid of a second modification.

Moreover, as shown by the container 1M of the second modification in FIG. 15, a lid 3M may be screwed onto an opening 4M of its container body 2M having a rectangular tubular shape. For instance, a circular opening 4M may be formed in the central portion of the end portion of the square shape of the container body 2M. The opening 4M at the end of the container body 2M is closed with the lid 3M that is in the form of an inner-and-outer stopper (i.e., inner-and-outer stopper plug).

The lid 3M of the second modification has a quadrangular shape in a plan view, and has a cylindrical portion 13 that fits into (i.e., interdigitates with) the opening 4M of the container body 2M. A non-illustrated intermediate member is applied to the outer peripheral surface of this cylindrical portion 13. The lid 3M is screwed onto the opening 4M of the container body 2M. A hollow portion 10 recessed inward of the container body 2M is formed at the center of the lid 3M.

In the container body 2M of the second modification, the thickness at the periphery of the opening 4M is not uniform. In this case, the specific dimension is defined as the thickness dimension of the thinnest portion at the periphery of the opening 4M. Additionally, in the lid 3M, the thickness of the wall portion separating its inside and outside is the same as the specific dimension. Further, the thickness of the wall portion of the lid 3M is uniform throughout. It is sufficient that the thickness of the wall portion of the lid 3M is within the range of 1 to 3 times the wall thickness of the container body 2M.

Although the specific dimension is defined as the thickness of the thinnest portion at the periphery of the opening 4M, other thickness may be defined as the specific dimension. For instance, the wall thickness of the thickest portion at the peripheral edge of the opening 4M of the container body 2M may be defined as the specific dimension. In addition, the average wall thickness of the periphery of the opening 4M of the container body 2M may be defined as the specific dimension.

It should be noted that the configuration applied in any one of the above-described examples and modifications may be applied to another example or modification, and the configuration applied in each of the examples and modifications may be used in combination.

Incidentally, the lid 3 of the present embodiment means a member that has an inner surface area smaller than the area of the inner surface of the container body 2 under the state where the opening 4 of the container body 2 is closed. In addition, under the state where the opening 4 of the container body 2 is closed, it is sufficient that the area of the inner surface of the lid 3 is equal to or less than half of the area of the inner surface of the container body 2. Further, in the case of closing plural openings 4 provided in one container body 2 with respective plural lids 3, it is sufficient that the area of the inner surface of each lid 3 is equal to or less than half of the area of the inner surface of the container body 2.

In addition, the shape of the lid 3 of the present embodiment is not limited to a cylindrical shape, and may be a box shape, a spherical shape, or another shape.

Further, the thickness B of the wall portion 5 of the container body 2 is not limited to the one that is uniform throughout but may be non-uniform. When the thickness B of the wall portion 5 of the container body 2 is non-uniform, the specific dimension may be defined as any one of the wall thickness of the thinnest portion, the wall thickness of the thickest portion, and the average value of the thickness B of the wall portion 5 of the container body 2.

It should also be noted that the thickness L of the wall portion 6 of the lid 3 is not limited to the one being uniform as a whole but may be non-uniform. When the thickness L of the wall portion 6 of the lid 3 is non-uniform, it is sufficient that the wall thickness of the thinnest portion is within the range of 1 to 3 times the specific dimension. Further, it is sufficient that the wall thickness of the thickest portion is within the range of 1 to 3 times the specific dimension. Moreover, it is sufficient that the average value of the thickness L of the wall portion 6 of the lid 3 is within the range of 1 to 3 times the specific dimension.

According to the above-described embodiment, a container can be improved in resistance to temperature change by being equipped with such a lid for closing an opening of its container body that its constituent material includes at least silicon carbide and thickness of the wall portion separating its inside and outside is within the range of 1 to 3 times the specific dimension of the container body.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A nuclear fuel cladding tube, comprising:
    a container body that includes a wall portion separating inside and outside and is formed of a long-fiber-reinforced silicon-carbide composite material obtained by combining monofilaments of silicon carbide with a silicon carbide matrix, the wall portion having a thickness equal to a specific dimension; and
    a lid configured to close at least one opening of the container body, formed of a material containing at least silicon carbide, and equipped with a wall portion separating inside and outside of the lid that has a thickness within a range of 1.2 to 1.9 times the specific dimension, wherein
    the container body accommodates nuclear fuel of a nuclear reactor,
    the lid is an end plug that closes the at least one opening at an end portion of the container body,
    a shape of the lid is at least one of a shape of an outer stopper covering an outer periphery of the end portion of the container body and a shape of an inner stopper provided inside the at least one opening,
    a bonding portion where the container body and the lid overlap is hermetically sealed,
    a gap between the container body and the lid is sealed with an intermediate material under a state where the at least one opening is closed with the lid, the gap formed by overlapping the container body and the lid, and
    at least the bonding portion is locally heated.

2. The nuclear fuel cladding tube according to claim 1, wherein a thickness of a portion where the container body overlaps with the lid in a state of closing the at least one opening with the lid is within a range of 1.2 to 1.9 times the specific dimension.

3. The nuclear fuel cladding tube according to claim 1, wherein a screw cutting is formed on each of the container body and the lid in such a manner that the lid is screwed onto the container body.

4. The nuclear fuel cladding tube according to claim 1, wherein
    metallization is applied to the respective bonding surfaces, and
    the intermediate material is applied to an area subjected to the metallization in such a manner that the intermediate material enters the gap and the gap is sealed by the intermediate material under a state where the at least one opening is closed with the lid.

5. The nuclear fuel cladding tube according to claim 1, wherein
    the container body has a cylindrical shape, and
    the at least one opening is provided at one end portion or each of both end portions of the container body to be closed with the lid.

6. The nuclear fuel cladding tube according to claim 1, wherein the intermediate material contains at least one of (a) an inorganic adhesive using metal alkoxide of silicate type or phosphate type, (b) a ceramic precursor polymer of polycarbosilane, polycarbosilazane, or polyorganoborosilazane, (c) a carbon adhesive using phenolic resin, (d) a metal brazing material of silver braze, gold braze, platinum braze, palladium braze, phosphorous copper braze, or nickel braze, and (e) an inorganic brazing material of glass, silicon, or metal oxide.

7. The nuclear fuel cladding tube according to claim 1, wherein the intermediate material contains (a) an inorganic adhesive using metal alkoxide of silicate type or phosphate type, (b) a ceramic precursor polymer of polycarbosilane, polycarbosilazane, or polyorganoborosilazane, and (c) 30 to 60 wt % of silicon carbide additive.

8. The nuclear fuel cladding tube according to claim 1, wherein the lid is formed of a long-fiber-reinforced silicon-carbide composite material obtained by combining monofilaments of silicon carbide with a matrix of silicon carbide.

9. The nuclear fuel cladding tube according to claim 1, wherein the specific dimension is equal to or more than 0.5 mm.

10. The nuclear fuel cladding tube according to claim 9, wherein the specific dimension is equal to or less than 5 mm.

11. The nuclear fuel cladding tube according to claim 1, wherein the intermediate material is wire-shaped.

12. A method for closing an opening of a nuclear fuel cladding tube, comprising:
    forming a container body from a long-fiber-reinforced silicon-carbide composite material obtained by combining monofilaments of silicon carbide with a matrix of silicon carbide, in such a manner that a wall portion for separating inside and outside of the container body has a thickness equal to a specific dimension;
    forming a lid from a material containing at least silicon carbide in such a manner that a wall portion for separating inside and outside of the lid has a thickness within a range of 1.2 to 1.9 times the specific dimension, wherein the container body accommodates nuclear fuel of a nuclear reactor, the lid is an end plug that closes an opening at an end portion of the container body, and a shape of the lid is at least one of an outer stopper covering an outer periphery of the end portion of the container body and an inner stopper provided inside the opening of the container body;
    closing the opening with the lid;
    sealing a bonding portion where the container body and the lid overlap;
    applying an intermediate material to seal a gap between respective bonding surfaces of the container body and the lid, the gap formed after the sealing the bonding portion; and
    locally heating at least the bonding portion.

13. The method for closing the opening of the nuclear fuel cladding tube according to claim 12, further comprising:
    causing the intermediate material to enter the gap under capillary phenomenon by melting the intermediate material.

14. The method for closing the opening of the nuclear fuel cladding tube according to claim 12, further comprising: performing metallization on an entry range of an intermediate material in advance, the intermediate material being for sealing a gap where the container body overlaps with the lid face.

15. The method for closing the opening of the nuclear fuel cladding tube according to claim 12, wherein the container body or the lid is formed by at least one of a chemical vapor deposition method and a chemical vapor infiltration method.

\* \* \* \* \*